Patented Apr. 8, 1930

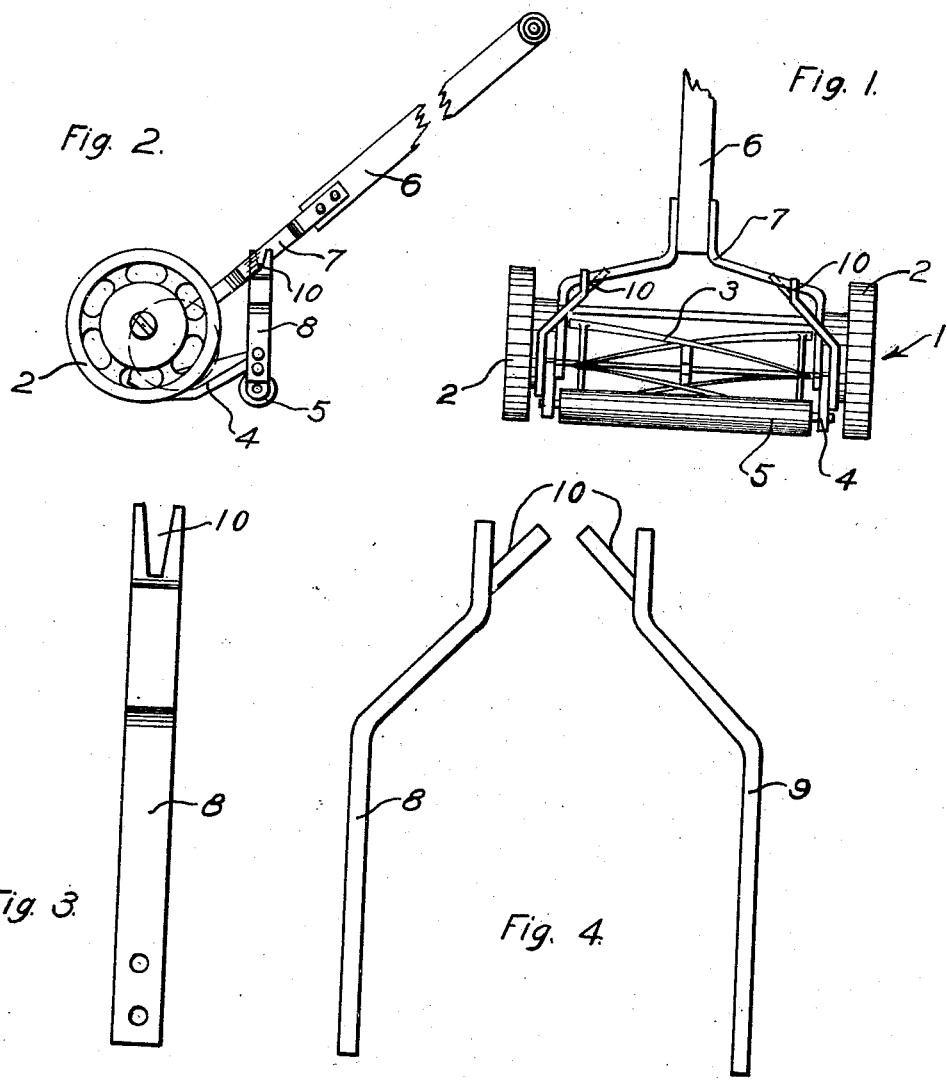

1,753,558

UNITED STATES PATENT OFFICE

WILL EDWARDS, OF JACKSONVILLE, ILLINOIS

ATTACHMENT FOR LAWN MOWERS

Application filed July 23, 1928. Serial No. 294,619.

My invention consists in new and useful improvements in an attachment for lawn mowers and has for its object to provide a device which may be easily applied to the conventional type of lawn mower to facilitate its operation and to equalize and distribute the force employed in pushing the same over a lawn.

Heretofore, lawn mowers, particularly of the cheaper grade have encountered considerable difficulty in cutting heavy grass, in that due to their lightness of structure, their rear ends would buck up leaving an unevenly cut or undulated lawn.

It is the object of my invention to overcome this difficulty, and to this end I have provided a set of equalizers adapted to be mounted at the rear end of the lawn mower, to engage the bail of the handle, whereby the pushing force is equally distributed and the lawn mower maintained in an even cutting position.

With the above and other objects in view which will appear as the description proceeds, my invention consists in the novel features herein set forth, illustrated in the accompanying drawing and more particularly pointed out in the appended claims.

Referring to the drawing, in which numerals of like character designate similar parts throughout the several views, Figure 1 is a perspective view from the rear end of the lawn mower showing my improved attachment applied thereto.

Figure 2 is a view in side elevation,

Figure 3 is an enlarged side view of one of my improved equalizers, and

Figure 4 is a view at right angle to Figure 3 showing the right and left members of the equalizer.

In the drawing 1 represents a conventional lawn mower comprising the usual wheels 2, cutting blades 3, frame 4, roller 5, handle 6 and handle bail 7 secured to the frame 4.

8 and 9 represent respectively the left and right equalizers embodying my invention which consist of vertically extending strips of iron or other suitable metal, removably secured at their lower ends to the frame 4, immediately adjacent the roller 5. Any suitable means such as bolts or screws may be employed for securing said strips to the frame of the mower. As clearly shown in Figures 1 and 4, these strips 8 and 9 extend vertically for a portion of their length and are then bent inwardly, being bifurcated at their upper extremities as at 10. These bifurcated portions 10 are adapted to removably engage the horizontal portions of the bail 7 of handle 6, whereby when a forward and downward pressure is applied to the handle 6, said pressure will be equally distributed between the front portion of the frame of the mower carrying the wheels 2 and the rear portion of the same, adjacent the roller 5.

It will be noted that the bail 7 of the handle 6 is in no way permanently secured to the strips 8 and 9, but merely rests in the bifurcations 10, and may be raised or lowered if desired.

It is obvious that with my improved equalizer, any conventional lawn mower may be efficiently employed for cutting lawns of varying thickness, leaving a smooth and even cut throughout.

From the foregoing it is believed that my invention may be clearly understood by those skilled in the art without further description, it being borne in mind that numerous changes may be made in the details of construction without departing from the spirit of the invention, as set forth in the following claims.

What I claim and desire to secure by Letters Patent is:

1. An equalizer for lawn mowers, comprising a plurality of strips of suitable material adapted to be secured at their lower ends to the rear portion of the frame of said lawn mower, said strips extending upwardly, their upper ends loosely engaging the bail of the handle of the mower, whereby the pushing force supplied to said handle is distributed between the front and rear portions of the lawn mower frame and the rear end prevented from bucking up.

2. An equalizer as claimed in claim 1, wherein said strips are bifurcated at their upper ends to engage the handle bail.

3. An equalizer as claimed in claim 1 wherein one of said strips is applied to each side of the mower frame adjacent the roller, said strips extending upwardly for a portion of their length, then being bent inwardly toward one another and bifurcated at their upper extremities to engage the handle bail.

4. An attachment for lawn mowers comprising a strip of suitable material, means for securing said strip at its lower end to the rear end of the frame of said lawn mower its upper end being bifurcated for loosely engaging the handle bail of the mower, whereby the pushing force applied to the handle is evenly distributed.

In testimony whereof I affix my signature.

WILL EDWARDS.